United States Patent [19]
Hope et al.

[11] 3,733,926
[45] May 22, 1973

[54] INTERCHANGEABLE DRIVE WITH BALANCING GEARS

[76] Inventors: Henry F. Hope, 195 Welsh Road, Huntingdon Valley, Pa. 19006; Stephen F. Hope, 2421 Wyandotte Road, Willow Grove, Pa.

[22] Filed: June 18, 1971

[21] Appl. No.: 153,168

[52] U.S. Cl. ................................................74/410
[51] Int. Cl. ...........................................F16h 57/00
[58] Field of Search.................................14/410

[56] References Cited

UNITED STATES PATENTS

| | | | |
|---|---|---|---|
| 1,165,829 | 12/1915 | Alquist | 74/410 |
| 2,091,637 | 8/1937 | Hoffman et al. | 74/410 |
| 2,370,002 | 2/1945 | Brecht | 74/410 |
| 2,703,021 | 3/1955 | Stoeckicht | 74/410 |

*Primary Examiner*—Leonard H. Gerin
*Attorney*—Karl L. Spivak

[57] ABSTRACT

An interchangeable drive with balancing gears in peripheral arrangement about a drive gear to equalize stresses upon the drive gear shaft and bearings when the drive gear meshes with and drives a gear train system.

2 Claims, 3 Drawing Figures

PATENTED MAY 22 1973
3,733,926
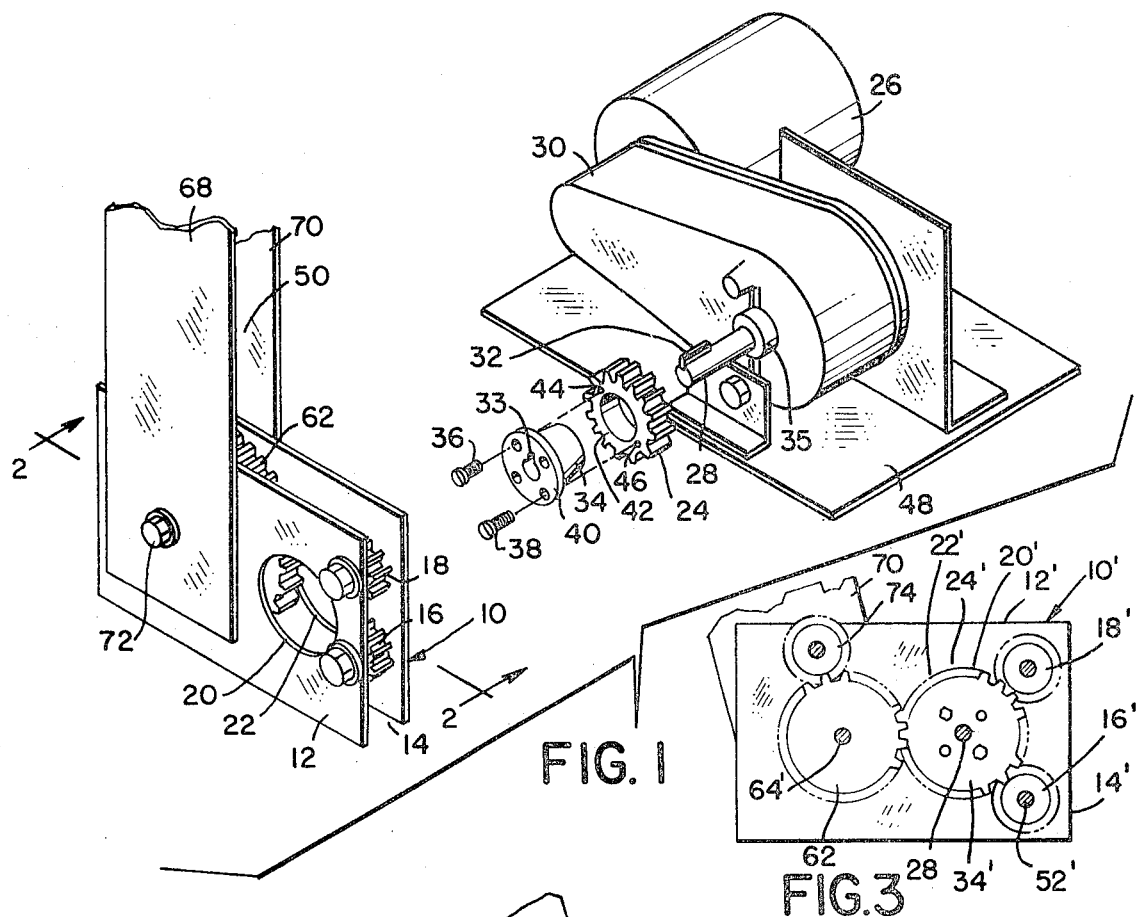
FIG. 1
FIG. 3
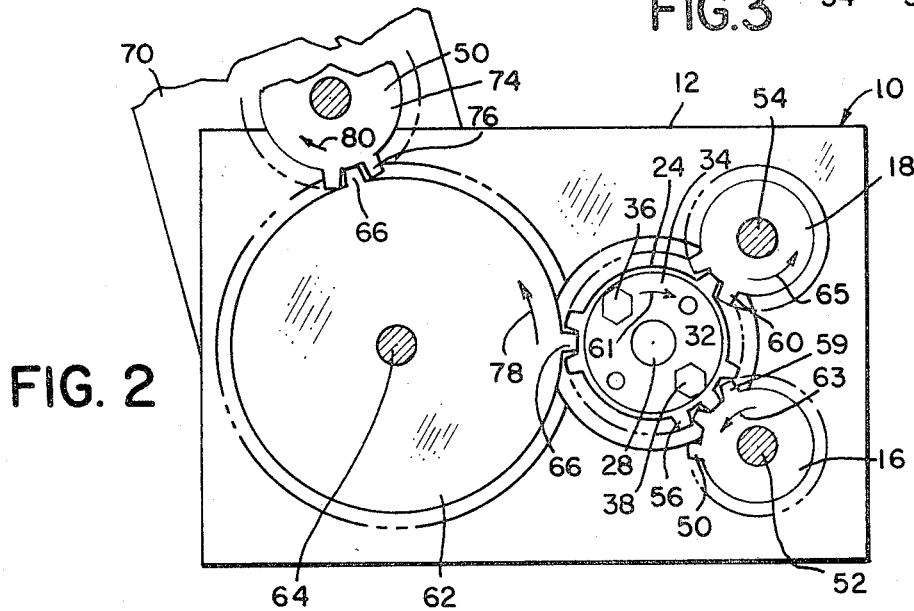
FIG. 2
INVENTORS.
HENRY F. HOPE
STEPHEN F. HOPE
BY Karl L. Spivak
ATTORNEY.

INTERCHANGEABLE DRIVE WITH BALANCING GEARS

BACKGROUND OF THE INVENTION

The present invention relates generally to the field of motor driven equipment, and more particularly, is directed to improving the interaction of driving and driven gears in a gear train system.

It is common practice to employ a driving motor to power a driving gear for energizing various types of gear train assemblies. One such type of gear train is disclosed in our co-pending application entitled "Film Turnabout System," Ser. No. 97,808 wherein a gear train has been employed to drive a plurality of rollers for film processing purposes.

It has been found in designing and operating gear train employing equipment that the stresses imposed by the interaction of the drive gear as it meshes with the driven gear quite often results in undue wear, noise, and occasionally even slippage. The unbalanced forces generated by the drive gear result in uneven wear at the driving gear shift and bearings thereby causing operating and maintenance problems.

SUMMARY OF THE INVENTION

The present invention relates generally to gear train assemblies suitable for use with automatic x-ray or other processing equipment employing gear operated rollers, and more particularly, to a novel interchangeable drive with a balancing gear arrangement for equalizing stresses imposed upon the driving gear shaft and bearings during operation of the equipment.

The balancing gear system of the present invention incorporates the use of two or more peripherally positioned gears arranged within spaced side carriers in circumferentially spaced relationship from the contact area between the driving gear and the driven gear of a gear train system. The lead driven gear and the peripherally positioned balancing gears journal within the same side carriers for gear train operating purposes. The balancing gears cooperate to rotatively absorb unbalance forces of the drive gear without permitting lateral movement, bending, or other relative motion of the drive gear shaft.

The balancing gears circumferentially space about the driving gear with respect to the driven gear and serve to absorb an equal share of the stresses imposed by the driving motor upon the driving gear. In this manner, several circumferential mesh areas are provided to mesh with the driving gear to take up and equalize driving stresses about the periphery of the gear. By equalizing the peripheral stresses of the driving gear, stresses at the driving gear shaft and the shaft bearing are also similarly equalized to thereby prevent undue wear, unbalance or deflection.

It is therefore an object of the present invention to provide an improved balancing gear system of the type set forth.

It is another object of the present invention to provide a novel balancing gear system which employs a plurality of peripherally positioned gears to balance forces imposed at the driving gear.

It is another object of the present invention to provide a novel balancing gear system incorporating an interchangeable driven gear, and peripherally positioned balancing gears, all journaled within common side carriers.

It is another object of the present invention to provide a novel balancing gear system wherein the lead driven gear and a plurality of balancing gears rotatively journal within side carriers and wherein the side carriers are readily interchangeable with a process gear train system to permit speedy gear train speed adjustment.

It is another object of the present invention to provide a novel interchangeable drive with balancing gears incorporating a readily replaceable drive gear and an equally replaceable cooperating lead driven gear arranged within side carriers for varying the speed of operation of a gear train system.

It is another object of the present invention to provide a novel balancing gear system that is rugged in construction, inexpensive in manufacture and trouble free when in use.

Other objects and a fuller understanding of the invention will be had by referring to the following description and claims of a preferred embodiment thereof, taken into conjunction with the accompanying drawings, wherein like reference characters refer to similar parts throughout the several views and in which:

BRIEF DESCRIPTION OF THE DRAWINGS

FIG. 1 is an exploded, perspective view of an interchangeable drive with balancing gears in accordance with the present invention.

FIG. 2 is a sectional view taken along Line 2—2 of FIG. 1 showing the gears in mesh for gear train driving purposes.

FIG. 3 is a view similar to FIG. 2 on reduced scale showing driving and driven gears of modified size.

DESCRIPTION OF THE PREFERRED EMBODIMENT OF THE INVENTION

Although specific terms are used in the following description for the sake of clarity, these terms are intended to refer only to the particular structure of our invention selected for illustration in the drawings and are not intended to define or limit the scope of the invention.

Referring now to the drawings, we show in FIG. 1 an interchangeable drive with balancing gears 10 which includes a pair of spaced side carriers 12, 14 through which are journaled a pair of peripherally positioned balancing gears 16, 18. Each side carrier 12, 14 is provided with opening means 20, 22 to operatively receive the driving gear 24 therein for gear train operational purposes as hereinafter more fully set forth.

An electrical motor 26 rotates the driving shaft 28 through a gear drive 30 in conventional manner. The driving gear 24 removably affixes to the driving shaft 28 in conventional manner by means of the shaft affixed key 32. The driving gear 24 positions between the side carriers 12, 14 by utilizing the flanged bearing 34 in conventional manner for rotative purposes. A pair of fastening bolts 36, 38 secure the flanged portion 40 to the outer face 42 of the driving gear 24 by turning into the threaded openings 44, 46 in well-known manner. The motor 26 and gear drive 30 mounts securely to fixed construction 48 which may be a portion of the apparatus (not shown) which employs the gear train system 50. A key 32 or similar construction affixes to the end of the drive shaft 28 and is a sliding fit into the keyway 33 which is machined in the flanged bearing 34 for drive gear rotative purposes in conventional manner.

As best observed in FIG. 2, the balancing gears 16, 18 journal through the side carriers 12, 14 and freely rotate about their respective shafts 52, 54 intermediate the side carriers. The flanged bearing 34 inserts through the side carriers 12, 14 to rotatively support the driving gear 24 in position to mesh with the balancing gears 16, 18. The driving gear teeth 56 mesh respectively with the gear teeth 59,60 of the balancing gears 16, 18 in manner to rotate the balancing gears 16, 18 as the driving gear 24 is itself rotated by the energy supplied by the electric motor 26. As indicated by the arrows 61, 63, 65, clockwise rotation of the driving gear 24 will produce counter clockwise rotation in both the balancing gear 16 and balancing gear 18.

A speed determining driven gear 62 also mounts within the side carriers 12, 14 and journals about its side carrier affixed shaft 64 in a manner to rotate when driven by the driving gear 24. The speed determining driven gear 62 locates upon the side carriers 12,14 in precise location to mesh the driven gear teeth 66 with the driving gear teeth 56. Clockwise rotation of the driving gear 24 produces simultaneous counterclockwise rotation of the driven gear 62 about its shaft 64 in the direction indicated by the arrow 78. In the embodiment illustrated, the diameter of the speed determining driven gear 62 is shown approximately twice that of the diameter of the driving gear 24. In accordance with well-known gear drive principles, the peripheral speed of the driven gear 62 will be directly proportional to the peripheral speed of the driving gear 24 in accordance with the ratio of the diameters.

The side carriers, 68, 70 of the gear train system 50 journal the shafts of a plurality of meshed gears therein in well-known manner and bottomly removably secure to the balancing gear system side carriers 12, 14 by means of the bolted fastener 72 which may secure to an extension of the driven gear shaft 64 if so desired. The side carriers 68 70 position the lowest gear 74 of the gear train system in precise location so that the lowest gear teeth 76 mesh with the driven gear teeth 66 for gear train operation purposes. As can be seen from the arrows 78, 80, a counterclockwise rotation of the driven gear 62 will result in clockwise rotation of the lowest gear 74 of the gear train system 50. Also, depending on the ratio of the respective diameters of the driving gear 24 and the driven gear 62, the gear train system may be driven faster or slower as desired in accordance with well-known gear design and techniques without altering the speed of operation of the motor 26 or drive 30.

When it is desired to change the operating speed of the gear train system 50, the driving gear 24 is disassociated from the interchangeable drive with balancing gears 10 by loosening the fastening bolts 36,38 to free the driving gear 24 from its associated flanged bearing 34. After the fasteners 36, 38 have been removed, the side carriers 12, 14 can be disassociated from the driving gear 24. The gear 24 can then be removed from the driving shaft 28 by imposing sufficient axial forces to free the driving gear 24 from the driving shaft 28 and the affixed key 32 in conventional manner. The side carriers 12, 14 and the driven gear 62 are then disconnected from the gear train system 50 by removing the fastener 72 to disconnect the gear train side carriers 68, 70 from the balancing gear side carriers 12, 14.

Referring now to FIG. 3, we show a substitute interchangeable drive with balancing gears 10' which is similar to the balancing gear system 10 previously described and which incorporates a pair of balancing gears 16', 18' journaled through the side carriers 12', 14', and are rotative therebetween. A driving gear 24' of diameter different from the driving gear 24 secures to the motor driving shaft 28 and rotatively mounts between the side carriers 12', 14', by means of the flange bearing 34' in the manner hereinfore described for the driving gear 24. The flange bearing 34' is fabricated of suitable diameter to accommodate the diameter of the modified driving gear 24' and the side carrier opening means 20', 22' must be similarly modified as required for satisfactory operation. A speed determining driven gear 62' has its shaft 64' rotatively journaled between the side carriers 12', 14' and is fabricated of diameter necessary to mesh with both of the driving gear 24' and the lowest gear 74 of the gear train system 50. Thus, when it is desired to change the speed of operation of the gear train system 50 while employing the same motor 26 and gear drive 30, a different driving gear 24' may be employed in conjunction with modified side carriers 12', 14', balancing gears 16', 18' and a speed determining driven gear 62'. The modified balancing gear system 10' affixes to the side carriers 68, 70 of the gear train system 50 by means of the threaded fasteners 72 in the manner hereinfore set forth. Thus, it is possible to readily vary the speed of operation of any gear train system 50 by employing a balancing gear system 10, 10' in conjunction with driving gears 24, 24' and speed determining driven gears 62, 62' of various cooperating diameters in accordance with well-known gear construction techniques.

Referring now to FIGS. 2 and 3, it will be observed that the balancing gears 16, 16', 18, 18' and driven gears 62, 62' respectively space about the periphery of the driving gears 24, 24', and all respectively mesh therewith. Accordingly, as a driving gear 24, 24' is rotated by means of the motor 26 and gear drive 30, the peripheral forces generated at the gear 24, 24' are respectively applied simultaneously at the balancing gears 16, 16', 18, 18' and the driven gear 62 or 62'. Accordingly, by spacing these gears equidistantly about the periphery of the driving gear, the forces may be relatively uniformly distributed about the periphery of the driving gear 24, 24'. In this manner, radial forces imposed upon the flange bearing 34 or the motor shaft bearing 35 are equidistantly distributed to thereby avoid unbalance and undue wear at the bearings. Accordingly, peripherally arranged balancing gears 16, 18 and 16', 18' serve to insure long bearing life by preventing unequal bearing wear.

We claim:

1. In an interchangeable drive for operatively connecting a gear train system to a driving gear, wherein the driving gear generates unbalanced radially directed forces, the combination of
   A. a pair of spaced side carriers interposed between the gear train system and the driving gear,
      1. said side carriers being provided with aligned openings,
      2. said openings receiving and journalling the driving gear therein,
      3. said side carriers being removably connected to the driving gear by a flange bearing which journals the driving gear within the aligned openings;
   B. a speed determining driven gear journalled in a shaft which is supported within the side carriers, 1. said speed determining driven gear meshing with the driving gear and a gear of the gear train system to transmit rotative energy from the driving gear;

C. first and second balancing gears journalled on shafts which are supported within the side carriers,
   1. said balancing gears meshing with the driving gear and being driven thereby,
   2. said balancing gear shafts and the speed determining driven gear shaft cooperating to absorb any unbalanced, radially directed forces generated by the driving gear,
   3. the said balancing gears serving as idlers only and transmitting no rotative forces to any other gear, and
   4. the said balancing gears and said speed determining driven gear being angularly positioned about the periphery of the driving gear wherein three gears simultaneously mesh with the driving gear at respective peripherally angularly offset locations.

2. The invention of claim 1 wherein the angularly offset mesh locations of balancing gears and driven gear about the periphery of the driving gear are respectively equidistant.

* * * * *